United States Patent
Norton et al.

(10) Patent No.: US 7,461,881 B2
(45) Date of Patent: Dec. 9, 2008

(54) CONSUMER POST HOLE DIGGER

(75) Inventors: Jeffrey M. Norton, Lebanon, PA (US); Barry R. Albert, Dillsburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 0 days.

(21) Appl. No.: 11/973,097

(22) Filed: Oct. 5, 2007

(65) Prior Publication Data
US 2008/0054658 A1 Mar. 6, 2008

Related U.S. Application Data

(63) Continuation-in-part of application No. 11/400,551, filed on Apr. 7, 2006.

(51) Int. Cl.
*A01B 1/00* (2006.01)
(52) U.S. Cl. ...................... 294/50.8; 294/119
(58) Field of Classification Search ............... 294/16, 294/50.8, 57, 118, 119; 56/400.12; 254/132
See application file for complete search history.

(56) References Cited

U.S. PATENT DOCUMENTS

| | | | | |
|---|---|---|---|---|
| 618,873 A | * | 2/1899 | Harper | 294/119 |
| 934,029 A | * | 9/1909 | West | 175/316 |
| 1,106,198 A | * | 8/1914 | Everett | 29/224 |
| 1,484,100 A | * | 2/1924 | Wertz | 294/119 |
| 1,888,929 A | * | 11/1932 | McDowell | 294/50.8 |
| 2,232,393 A | * | 2/1941 | Knaust | 425/278 |
| 2,626,178 A | * | 1/1953 | Campbell | 294/117 |
| 4,489,969 A | * | 12/1984 | Merry | 294/50.8 |
| 5,320,363 A | * | 6/1994 | Burnham | 294/50.8 |
| 6,012,363 A | * | 1/2000 | Minkin | 81/383 |
| 6,068,315 A | * | 5/2000 | Vaughter | 294/50.8 |

* cited by examiner

*Primary Examiner*—Dean J Kramer
(74) *Attorney, Agent, or Firm*—David C. Jenkins; Eckert Seamans Cherin & Mellott, LLC

(57) ABSTRACT

This invention provides a post hole digger having a first, traverse pivot point, located on the lower section of two handle members, and a second, blade assembly pivot point located at the medial point of the blade assemblies. Because the first pivot point is a traverse pivot point, the handle members are only required to travel through a limited range of motion. Additionally, the second, blade assembly pivot point is preferably an offset pivot point. Thus, because the second, blade assembly pivot point is disposed at a medial point of the blade assemblies, the motion of the handle members, which are coupled to the upper ends of the blade assemblies, is reversed relative to the lower ends of the blade members.

10 Claims, 7 Drawing Sheets

CONSUMER POST HOLE DIGGER

CROSS REFERENCE TO RELATED APPLICATIONS

This application is a continuation in part of U.S. Utility patent application Ser. No. 11/400,551, filed Apr. 7, 2006.

BACKGROUND OF THE INVENTION

1. Field of the Invention

This invention relates to a light-weight post hole digger and, more specifically, to a post hole digger having a traverse pivot point coupling two handle assemblies to each other, a blade assembly having two blade members, each blade member pivotally coupled to one handle assembly, and an offset pivot point coupling the two blade members to each other.

2. Background Information

A post hole digger is structured to dig a hole having a generally narrow cross-sectional area relative to the depth of the hole. The hole was typically dug in a compacted particulate or granulated material, hereinafter "the ground." The material removed from the hole shall be referred to as "the dirt." The dirt was, typically, a loose granulate material. Preferably, the post hole had a greater cross-sectional area than a post that was inserted therein. A portion of the loose dirt, or another material such as concrete, was then reinserted into the annulus, or gap, between the post and the ground. Because the compacted ground was more firm than the loose dirt, and therefore provided better support for the post, it was desirable to have as narrow of a hole as possible. Thus, one factor in the design of a post hole digger was the span of the post hole digger during insertion and, especially, during removal. Keeping in mind that a worker must cyclically operate a manual post hole digger, other important factors related to how a worker interacted with the tool. Such factors included, but were not limited to, the weight of the post hole digger, the force required to operate the post hole digger, the amount of dirt collected during each cycle, and the range of motion through which a worker must act during each cycle. For example, a post hole digger with longer handles typically had a longer lever arm and, therefore, provided a greater closing force on the blade members; however, the handles may not be too long as the tool could be too heavy to lift repeatedly and/or too unwieldy to use comfortably.

Manual post hole diggers generally had two elongated handles with each handle having an upper hand grip portion and a blade coupled to a lower end. The handles or blades were pivotally coupled to each at a single pivot point. The blades moved between a first, open position and a second, closed position that corresponded to a first and second handle position. When the blades were in the first, open position a user thrust the post hole digger toward the ground and caused the blades to bite into the ground. To maximize the force of the bite, the blades were generally perpendicular to the ground when they were in the first, open position. To further maximize the force of the bite, the handles were generally vertically aligned with the blades so that substantially all of the worker's effort (force) was directed directly through the blades and into the ground. This configuration further allowed the worker to position his/her hands and wrists in a comfortable position, generally parallel to the ground. After the blades engaged the ground, the worker moved the handles into the second position thereby causing the blades to move into the second, closed position. During this motion, the dirt is separated from the ground. The closing force acting on the blades is related to the force applied to the handles. The force applied to the handles was enhanced by the length of the lever arm created by the length of the handle. After the blades have been closed, the worker, while holding the blades in the second, closed position, lifts the post hole digger thereby removing the dirt from the hole.

The quantity of dirt held by the blades is controlled by the shape of the blades and the nature of the dirt. Typically, the blades are elongated and have an arcuate cross-sectional shape. The blades were commonly somewhat pointed and the edges were shaped so that, when the blades were in the second, closed position, the blades substantially enclosed a quantity of dirt. The shape of the blades was also related to the configuration of the pivot point and the handles. That is, for example, if the blades were spaced far apart, e.g. to engage a greater quantity of dirt, the handles would have to travel through a greater arc in order to close the blades. A greater arc requires a wider hole and more effort by the worker. Lengthening the blades would reduce the amount of travel required to close the blades, but would, in turn, reduce the relative lever arm between the blades and the handles, thus requiring a greater effort on the part of the worker.

In addition to the shape of the blades, the ease of use and usability of a post hole digger was controlled by various factors such as, but not limited to, the length and shape of the handles and the type of the pivot point. As shown in FIG. 1, the most typical configuration for a prior art post hole digger had handles 1, 2 about five to six feet in length, blade members 3, 4 about one half foot to a foot in length, and an offset pivot point 5. That is, each handle 1, 2 or blade 3, 4 had a tab 6, 7 extending toward the other handle 1, 2 or blade 3, 4 with a pivot point 5 disposed thereon. The pivot point 5, typically, had a pair of openings (not shown), one on each tab 6, 7 and a pivot pin 8. The pivot point 5 was, typically, located near the interface between the handle 1, 2 and the associated blade 3, 4. Additionally, each tab had a length of about three inches thereby providing a separation between the handles, when in the first position, of about six inches. The longitudinal axis of each handle 1, 2 is generally aligned with the longitudinal axis for the associated blade 3, 4. Each handle 1, 2 further had a hand grip portion 9 disposed near the top of each handle 1, 2. When coupled by an offset pivot point, the hand grip portion 9 of each handle 1, 2 was located on the same side of the pivot point 5 as the blade 3, 4, associated with that handle 1, 2. To close the blades 3, 4, the worker pulled the handles 1, 2, apart. To open the blades 3, 4, a worker moved the handles 1, 2 together until the handles 1, 2 were generally parallel to each other. Additionally, the handles 1, 2 or blades 3, 4, typically, had a pivot stop structured to halt the rotation of the handles 1, 2 and blades 3, 4 when the handles 1, 2 and blades 3, 4 were generally parallel. With the blades 3, 4 held in a generally parallel configuration, a worker could concentrate on the downward motion of the tool without having to position the blades 3, 4 for the bite.

An offset pivot post hole digger according to this configuration is easy to manufacture and is not too heavy; however, the range of motion of the handles is not suitable for a moderately deep hole. When the handles 1, 2 are in the second position, i.e. pulled apart, the span (width) of the tool increases as a function of the distance from the pivot point 5. As the pivot point 5 is disposed at the lower end of the handles 1, 2, essentially the entire length of one handle 1 moves away from the other handle 2. Thus, in order for the handles 1, 2 to be in the second position, the hole must be wide. Conversely, when the handles are in the first position, i.e., generally parallel, the tool is in its most narrow configuration and can be easily inserted into the hole.

A post hole digger with a traverse pivot point has a scissor-like configuration, as shown in FIG. 2, wherein pulling the handles 1A, 2A apart results in the blades 3A, 4A moving apart and, conversely, moving the handles 1A, 2A together results in the blades 3A, 4A moving together. When a traverse pivot point 5A is used, the pivot point 5A is typically located near the lower end of the handles 1A, 2A, but above the blades 3A, 4A. As shown in FIG. 2, the blades 3A, 4A are generally disposed at an angle relative to the longitudinal axis of the handles 1A, 2A so that the blades 3A, 4A may be positioned generally perpendicular to the ground while still being separated. That is, if the blades 3A, 4A were generally aligned with the associated handles 1A, 2A and the blades 3A, 4A were in an open position, the blades 3A, 4A would not be generally perpendicular to the ground. In this configuration, the post hole digger is generally wider when the handles 1A, 2A are in the first position and more narrow when the handles 1A, 2A are in the second position; however, because the pivot point is located at a medial position on the handles 1A, 2A, the range of motion is generally smaller than on an offset pivot post hole digger.

In this configuration, a worker uses the, typically stronger, pectoral muscles to push the handles 1A, 2A together to close the blades 3A, 4A. While this could be considered an advantage, this motion is also the opposite of the motion generally associated with a post hole digger. As such, some workers do not care for a traverse pivot point post hole digger. This configuration also has a disadvantage in that, when thrusting the tool downwardly, the worker must hold the handles 1A, 2A within a generally narrow range of separation in order for the blades 3A, 4A to be maintained generally perpendicular to the ground during the bite. Moreover, the worker's hands may be in an awkward position during the thrust. That is, on a traverse pivot point post hole digger, the worker's hands are generally at an angle relative to the ground on the down stroke.

There is, therefore, a need for a post hole digger with a limited range of motion between the handle first position and handle second position.

There is a further need for a post hole digger having a traverse pivot point that is also structured to maintain the handles in a generally vertical and parallel orientation while the blades are in the first, open position.

There is a further need for such a post hole digger to have a reduced weight and size.

SUMMARY OF THE INVENTION

These needs, and others, are met by at least one embodiment of this invention which provides a post hole digger having a first, traverse pivot point, located on the medial portions of two handle members, and a second, blade assembly pivot point located at the medial point of the blade assemblies. Because the first pivot point is a traverse pivot point, the handles are only required to travel through a limited range of motion. Additionally, the second blade assembly pivot point is preferably an offset pivot point. Thus, because the second, blade assembly pivot point is disposed at a medial point of the blade assemblies, the motion of the handle members, which are coupled to the upper ends of the blade assemblies, is reversed relative to the lower ends of the blade members. In this configuration, the handle member's first position, which corresponds to the blade assembly open position, is in the preferred generally vertical and parallel orientation. Further, once the post hole digger has engaged the ground, a worker uses the preferred pulling apart motion on the handles to move the blade assembly into the second, closed position.

Additionally, the post hole digger may utilize a hand ledge disposed at the upper end of each handle as a stop member. That is, each hand ledge extends toward the opposite handle and is sized to abut the opposing hand ledge when the handles are generally parallel to each other. Thus, a worker does not have to manually maintain the position of the handle members as with the prior art traverse pivot point post hole diggers. As an added advantage, the hand ledges also help to resist the workers hands slipping upwardly on the handles when the worker lifts the post hole digger out of the hole.

Another embodiment of the invention utilizes similar mechanics and method of operation but has a reduced weight and size. In this embodiment the handle assembly has a reduced length. Due to the reduced length, the handle assembly does not include an angled lower portion. That is, the handle member medial portion and lower portion are combined into a generally straight lower section.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein an "offset pivot point" shall mean a configuration wherein each handle and associated blade may be, and generally are, disposed on the same side of the pivot point, the pivot point being located on one or more structures extending toward the opposing handle/blade.

As used herein a "traverse pivot point" shall mean a scissor-like configuration wherein two members cross over each other with the pivot point extending through the point of intersection.

As used herein, "coupled" means a link between two or more elements, whether direct or indirect, so long as a link occurs.

As used herein, "directly coupled" means that two elements are directly in contact with each other.

As used herein directional words, such as, but not limited to, "upper" and "lower" shall be used in relation to the Figures and are not limiting upon the claims.

Figure 1:
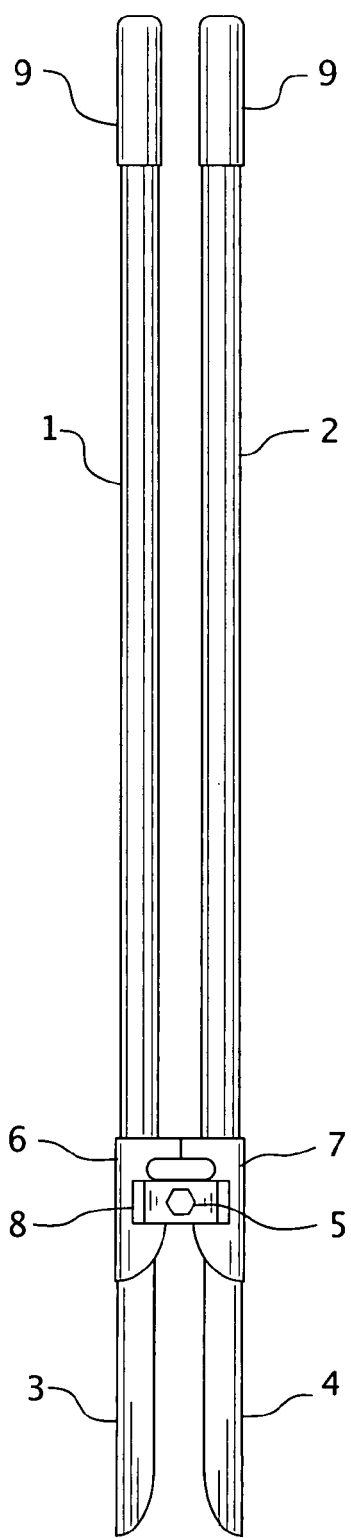
FIG. 1 is a front view of a prior art offset pivot post hole digger.
Figure 2:
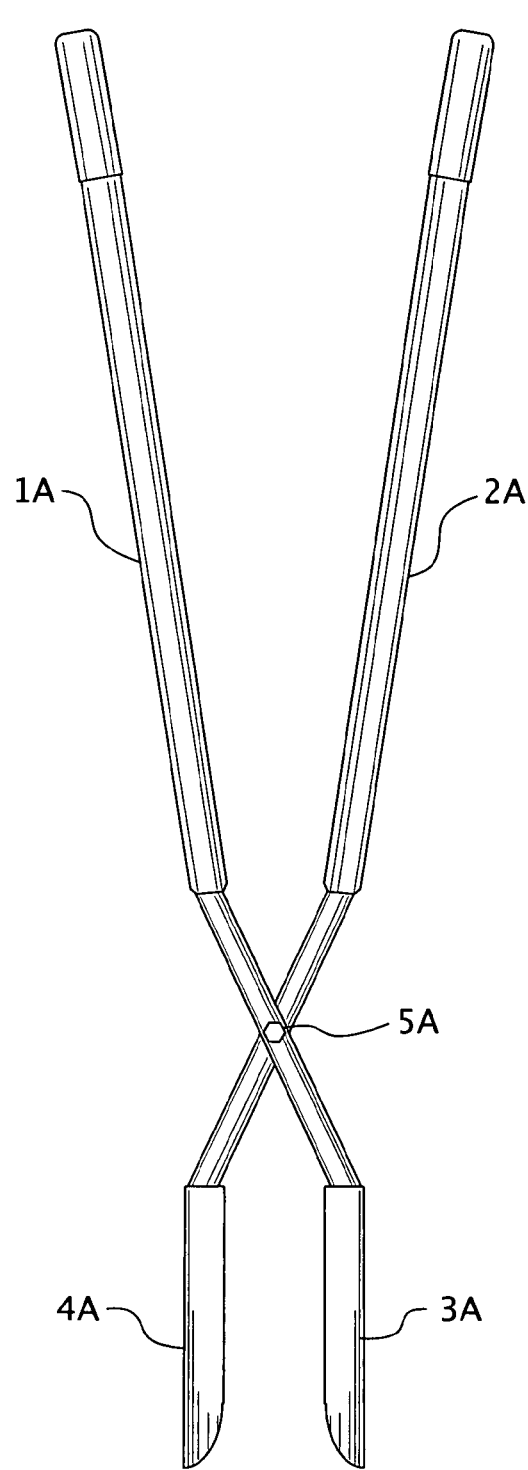
FIG. 2 is a front view of a prior art traverse post hole digger.
Figure 3:
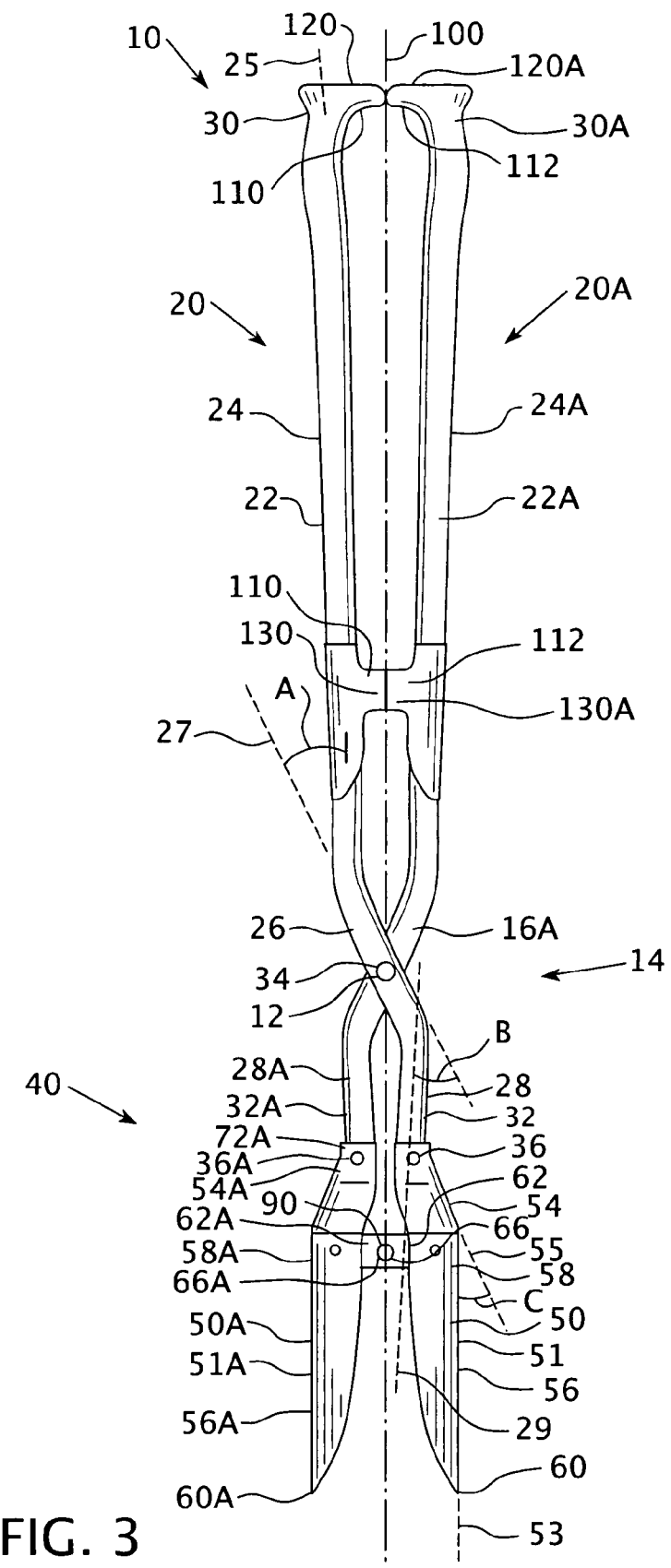
FIG. 3 is a front view of a post hole digger in a first position.
Figure 4:
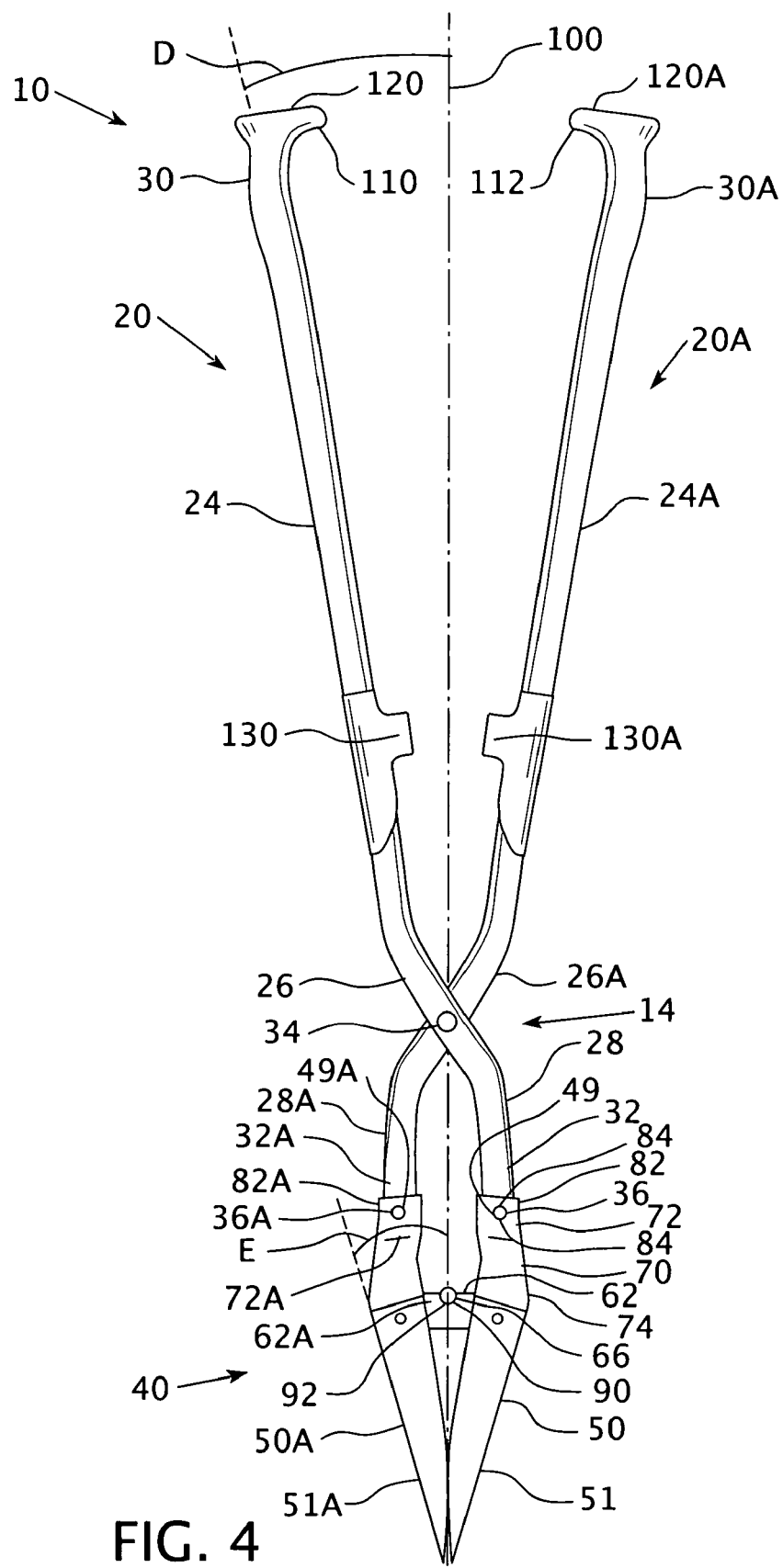
FIG. 4 is a front view of a post hole digger in a second position.

As shown in FIGS. 3 and 4, a post hole digger 10 includes a first handle assembly 20, a second handle assembly 20A, and a blade assembly 40. The first handle assembly 20 and the second handle assembly 20A are substantially similar in configuration except that the second handle assembly 20A is a mirror image of the first handle assembly 20. Accordingly, the following description will be addressed to the elements of the first handle assembly 20 and it is understood that the second handle assembly 20A includes substantially similar element.

Elements of the second handle assembly 20A shall use like reference numbers as the elements of the first handle assembly 20 and will be further identified with the letter "A." For example, and as described below, the first handle assembly 20 has a handle member 22. Thus, the second handle assembly 20A has a handle member 22A.

The first handle assembly 20 includes an elongated handle member 22 having an elongated, upper portion 24, a medial portion 26, and a lower portion 28. The first handle assembly handle member upper portion 24 has an upper end 30. The first handle assembly lower portion 28 has a lower end 32. The first handle assembly upper portion 24 has a longitudinal axis 25. The first handle assembly medial portion 26 has a longitudinal axis 27. The first handle assembly lower portion 28 has a longitudinal axis 29. The first handle assembly medial portion 26 has a pivot opening 34 extending generally perpendicular to the first handle assembly medial portion longitudinal axis 27. The first handle assembly lower end 32 has a first blade sub-assembly pivot opening 36 extending generally perpendicular to the first handle assembly lower portion longitudinal axis 29.

As shown in FIG. 3, the angle, identified as angle "A," between the first handle assembly handle member upper portion longitudinal axis 25 and the first handle assembly handle member medial portion longitudinal axis 27 is between about 20 to 24 degrees, and more preferably about 22.5 degrees. The angle, identified as angle "B," between the first handle assembly handle member lower portion longitudinal axis 29 and the first handle assembly handle member medial portion longitudinal axis 27 is between about 26 to 30 degrees, and more preferably about 28 degrees. It is noted that the angle B is in a direction opposite angle A. The first handle assembly upper portion 24 has a length between about 29.0 and 37.0 inches, and more preferably about 33.0 inches. The first handle assembly medial portion 26 has a length between about 6.5 and 8.5 inches, and more preferably about 7.5 inches. The first handle assembly lower portion 28 has a length between about 3.0 and 7.0 inches, and more preferably about 5.0 inches.

The blade assembly 40 includes a first blade sub-assembly 50 and a second blade sub-assembly 50A. As with the first and second handle assemblies 20, 20A, the first blade sub-assembly 50 and second blade sub-assembly 50A are substantially similar and mirror images of each other. As such, only the elements of the first blade sub-assembly 50 will be described in detail below. It is understood that that the second blade sub-assembly 50A includes substantially similar elements. Elements of the second blade sub-assembly 50A shall use the same reference numbers as the elements of the first blade sub-assembly 50 and will be further identified with the letter "A." For example, and as described below, the first blade sub-assembly 50 has a blade portion 51. Thus, the second blade sub-assembly 50A has a blade portion 51A.

Figure 5:
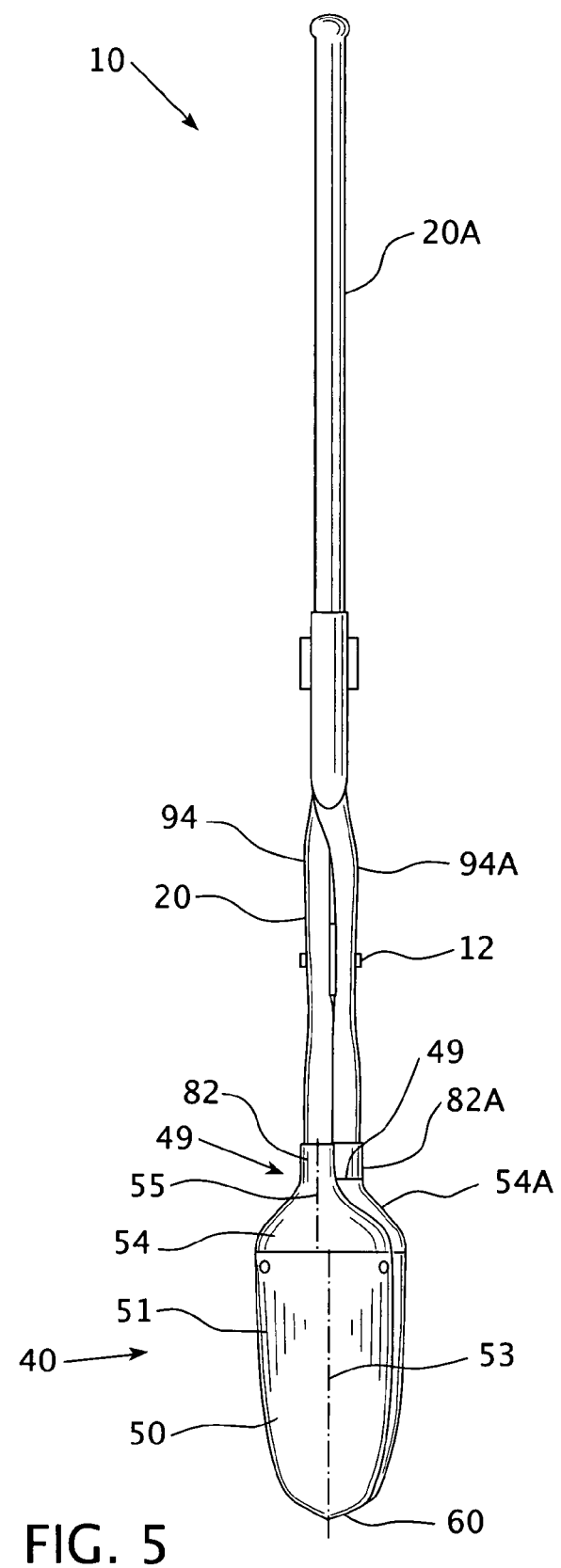
FIG. 5 is a side view of a post hole digger.

As shown in FIGS. 3 and 4, the first blade sub-assembly 50 has a lower, blade portion 51 and an upper base portion 54. The first blade sub-assembly blade portion 51 has a longitudinal axis 53 (FIG. 5). The first blade sub-assembly base portion 54 also has a longitudinal axis 55. The first blade sub-assembly blade portion 51 has an elongated blade body 56 having an upper end 58 and a lower end 60. The first blade sub-assembly blade portion 51 has a length between about 9.5 and 11.5 inches, and more preferably about 10.5 inches. The first blade sub-assembly blade body 56 has a generally arcuate cross-section extending about 180 degrees. The first blade sub-assembly blade body lower end 60 is, preferably, tapered to a point. The angle of the taper is governed by the configuration of the post hole digger, but generally, the taper is such that when the first blade sub-assembly 50 and the second blade sub-assembly 50A are in the closed position, as described below, the first blade sub-assembly blade body lower end 60 and the second blade sub-assembly blade body lower end 60A substantially engage each other so that the first blade sub-assembly 50 and the second blade sub-assembly 50A form a cup-like structure. The first blade sub-assembly blade portion 51 further includes at least one, and preferably two, offset tabs 62 (one shown). The first blade sub-assembly offset tabs 62 extend, generally perpendicular to the first blade sub-assembly blade member longitudinal axis 53, from the first blade sub-assembly blade portion upper end 58. The first blade sub-assembly offset tabs 62 each have a length of between about 4.5 and 5.5 inches, and more preferably about 5.0 inches. Each first blade sub-assembly offset tab 62 has a distal opening 66 therein. The first blade sub-assembly offset tab openings 66 on different offset tabs 62 are generally aligned with each other.

As shown on FIG. 4, the first blade sub-assembly base portion 54 has an upper, first end 72. The first blade sub-assembly blade base body upper first end 72 is also shaped with a generally U-shaped cross-section, however, the first blade sub-assembly blade base body upper first end 72 is much smaller than the associated blade portion 51. The first blade sub-assembly blade base body upper first end 72 forms a clevis 82 structured to accommodate the first handle assembly lower end 32. The clevis 82 has aligned openings 84 therein. The first blade sub-assembly blade portion 51 and the first blade sub-assembly base portion 54 may be angled relative to each other, identified as angle "C" in FIG. 3. In a preferred embodiment, the first blade sub-assembly base portion longitudinal axis 55 is angled between about 18 to 22 degrees, and more preferably about 20.3 degrees relative to the first blade sub-assembly blade portion longitudinal axis 53.

The first blade sub-assembly 50 and the second blade sub-assembly 50A are directly coupled to each other at a blade assembly pivot point 90. The blade assembly pivot point 90 is disposed at the interface between the first blade sub-assembly offset tabs 62 and the second blade sub-assembly offset tabs 62A. That is, when the first blade sub-assembly blade portion 51 and the second blade sub-assembly blade portion 51A are positioned opposite of and facing each other, the first blade sub-assembly offset tabs 62 and the second blade sub-assembly offset tabs 62A extend toward and overlap each other so that the first blade sub-assembly offset tab openings 66 generally align with the second blade sub-assembly offset tab openings 66A. The blade assembly pivot point 90 is created by separate pivot pins 92 extending through each set of aligned offset tab openings 66 and 66A.

To resist creating torque about the central longitudinal axis 100, described below, it is desirable to have the first and second handle assembly handle member upper portions 24, 24A disposed in the same general plane. As the first and second handle assembly handle member medial portions 26, 26A are pivotally coupled together, and therefore cannot be in the same plane, each handle assembly handle member 22, 22A may include a lateral transition section 94, 94A. That is, as shown in FIG. 5, the first handle assembly handle member lower portion 28 and the first handle assembly handle member medial portion 26 are generally disposed in a first lower plane. Similarly, the second handle assembly handle member lower portion 28A and the second handle assembly handle member medial portion 26A are generally disposed in a second lower plane. The first handle assembly handle member medial portion lateral transition section 94 is disposed between the first pivot point 14 (described below) and the first handle assembly handle member upper portion 24. The first handle assembly medial portion lateral transition section 94 is offset from the first lower plane toward a centrally disposed upper plane. Similarly, second handle assembly handle member medial portion lateral transition section 94A is disposed between the first pivot point 14 (described below) and the second handle assembly handle member upper portion 24A. The second handle assembly medial portion lateral transition section 94A is offset from the first lower plane toward a centrally disposed upper plane. Thus, when the first and second handle assemblies 20, 20A are coupled at the first pivot point 14 as described below, the first handle assembly handle member upper portion 24 and the second handle assembly handle member upper portion 24A are disposed in generally the same plane.

When the post hole digger 10 is assembled, the first handle assembly handle member 22 is pivotally coupled to the second handle assembly handle member 22A by a pivot pin 12 extending through the first handle assembly medial portion pivot opening 34 as well as the second handle assembly medial portion pivot opening 34A. The first handle assembly handle member 22 and the second handle assembly handle member 22A are oriented so as to generally be mirror images of each other. In this configuration, the first handle assembly handle member 22 and the second handle assembly handle member 22A cross over each other at the location of the first and second handle assembly medial portion pivot opening 34, 34A. Thus, this pivot point is a traverse, first pivot point 14.

The blade assembly 40 is pivotally coupled to the first and second handle assemblies 20, 20A. More specifically, the first blade sub-assembly 50 is pivotally coupled to the first handle assembly handle member lower end 32 by a first blade sub-assembly pivot pin 49. The first blade sub-assembly pivot pin 49 extends through the first blade sub-assembly clevis 82 as well as the first handle member first blade sub-assembly pivot opening 36. Similarly, the second blade sub-assembly 50A is pivotally coupled to the second handle assembly handle member lower end 32A by a second blade sub-assembly pivot pin 49A. The second blade sub-assembly pivot pin 49A extends through the second blade sub-assembly clevis 82A as well as the second handle member second blade sub-assembly pivot opening 36A. The first handle assembly lower end 32 is between about 6 and 10 inches, and preferably 8.0 inches, from the traverse, first pivot point 14. In this configuration, the tool assembly has a central longitudinal axis 100 extending through the traverse, first pivot point 14 and the blade assembly pivot point 90. It is further noted that, because each blade sub-assembly 50, 50A remains substantially to one side of the blade assembly pivot point 90, the blade assembly pivot point 90 is an offset pivot point.

In this configuration the first handle assembly 20 and the second handle assembly 20A are structured to pivot relative to each other between a first position, wherein the first handle assembly upper end 30 and the second handle assembly upper end 30A are generally adjacent to each other and a second position wherein the first handle assembly upper end 30 and the second handle assembly upper end 30A are generally spaced from each other. As the first handle assembly 20 and the second handle assembly 20A move between the first and second positions, the first blade sub-assembly 50 and the second blade sub-assembly 50A move between a corresponding first, open position and a second, closed position. That is, the first blade sub-assembly 50 and the second blade sub-assembly 50A are structured to pivot relative to each other between a first, open position and a second, closed position wherein when the first handle assembly 20 and the second handle assembly 20A are in the first position, the first blade sub-assembly 50 and the second blade sub-assembly 50A are in the first, open position, and, when the first handle assembly 20 and the second handle assembly 20A are in the second position, the first blade sub-assembly 50 and the second blade sub-assembly 50A are in the second, closed position.

Because the first pivot point 14 is a traverse pivot point, as the first handle assembly upper end 30 and the second handle assembly upper end 30A move apart, the first handle assembly lower end 32 and the second handle assembly lower end 32A also move apart. As the first handle assembly lower end 32 and the second handle assembly lower end 32A move apart, the first blade sub-assembly clevis 82, which is coupled to the first handle assembly lower end 32, and the second blade sub-assembly clevis 82A, which is coupled to the second handle assembly lower end 32A, also move apart. Because the blade assembly pivot point 90 is an offset pivot point, as the first and second blade sub-assembly blade base body upper, first ends 72, 72A move apart, the first and second blade sub-assembly blade body lower ends 60, 60A move toward each other.

Preferably, the traverse, first pivot point 14 and the blade assembly pivot point 90 are disposed between 9.0 and 15.0 inches apart, and more preferably about 12.0 inches apart. Thus, as shown on FIG. 4 by angle "D," the range of motion for the first and second handle assemblies 20, 20A moving between the first and second positions is between about 6.5 degrees and 10.5 degrees relative to the central longitudinal axis 100, and more preferably about 8.5 degrees. Additionally, as represented by the angle "E," the first and second blade sub-assembly blade portions 51, 51A travel between about 12 and 18 degrees, and more preferably about 15 degrees relative to the central longitudinal axis 100 as the first blade sub-assembly 50 moves between the first, open position and the second, closed position.

The handle assemblies 20, 20A may also include cooperative stop members 110, 112 structured to arrest the movement of the handle first and second members 22, 22A toward each other. In one embodiment, the cooperative stop members 110, 112 are hand ledges 120, 120A. One hand ledge 120, 120A is disposed at each handle assembly upper end 30, 30A. Thus, a first hand ledge 120 extends generally perpendicular to the longitudinal axis of the first handle assembly handle member upper portion 24 and toward the central longitudinal axis 100. Similarly, a second hand ledge 120A extends generally perpendicular to the longitudinal axis of the second handle assembly handle member upper portion 24A and toward the central longitudinal axis 100. The hand ledges 120, 120A do not extend beyond the central longitudinal axis 100 when the first and second handle assemblies 20, 20A are in the first position and, more preferably, the hand ledges 120, 120A abut each other when the first and second handle assemblies 20, 20A are in the first position.

Alternatively, a pair of cooperative stop members 110, 112 may be disposed, one each, along the middle of the first handle assembly upper portion 24 and the middle of the second handle assembly upper portion 24A. The cooperative stop members 110, 112 include a tab 130, 130A that extends generally perpendicular to the longitudinal axis of the associated handle assembly handle member upper portion 24, 24A and toward the central longitudinal axis 100. The tabs 130, 130A abut each other when the first and second handle assemblies 20, 20A are in the first position.

Figure 6:
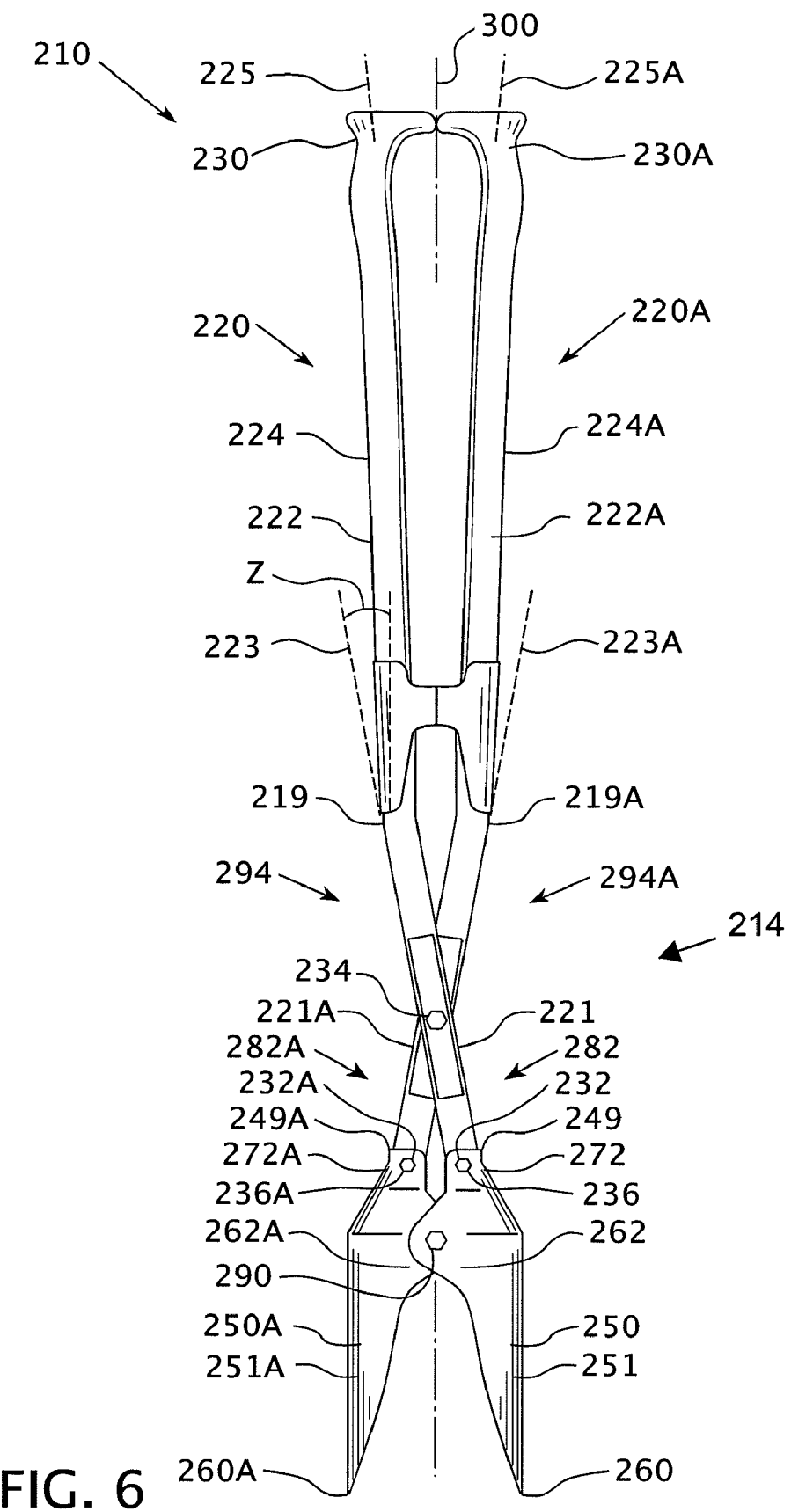
FIG. 6 is a front view of an alternate embodiment post hole digger in a first position.
Figure 7:
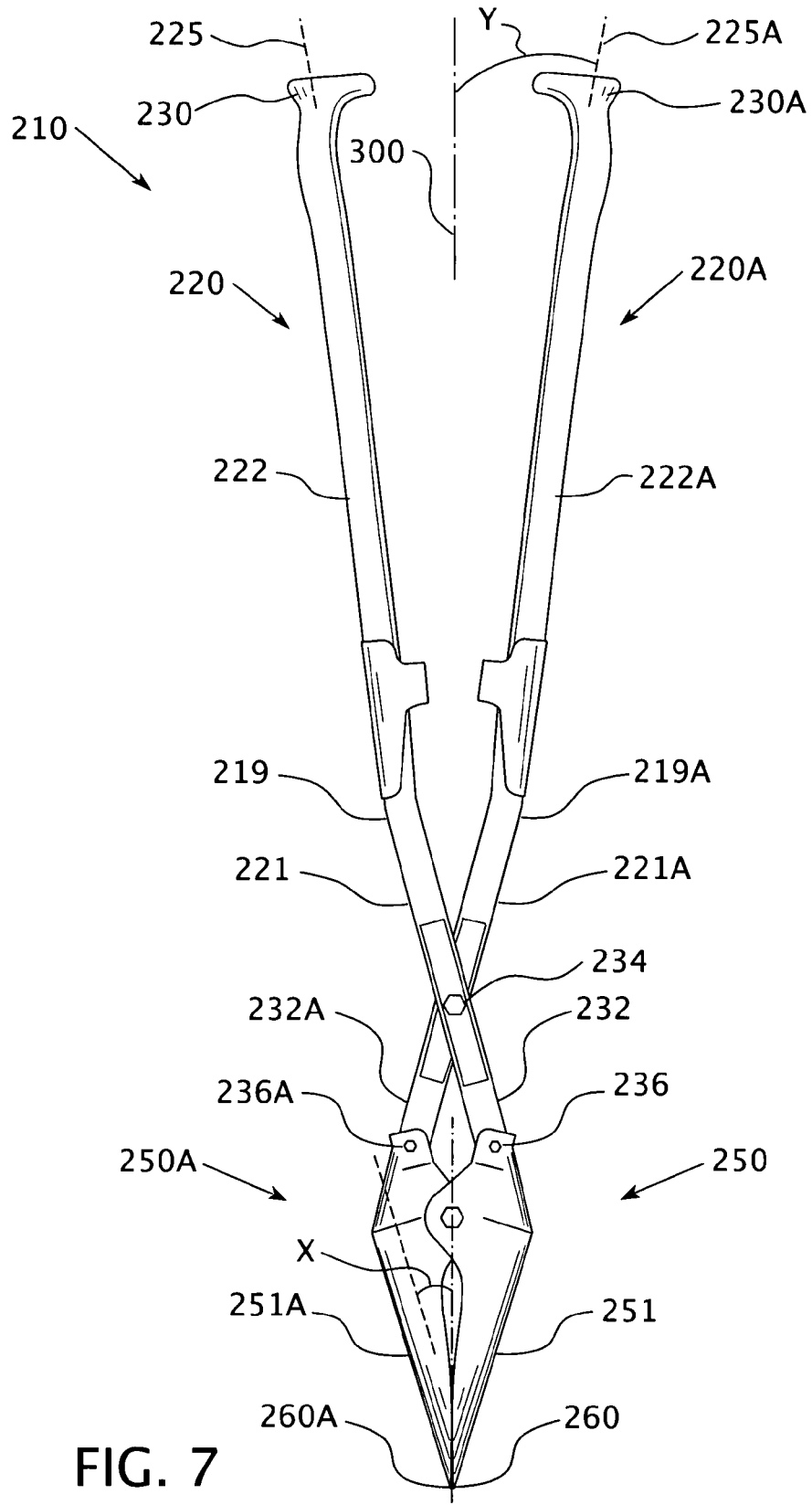
FIG. 7 is a front view of an alternate embodiment post hole digger in a second position.
Figure 8:
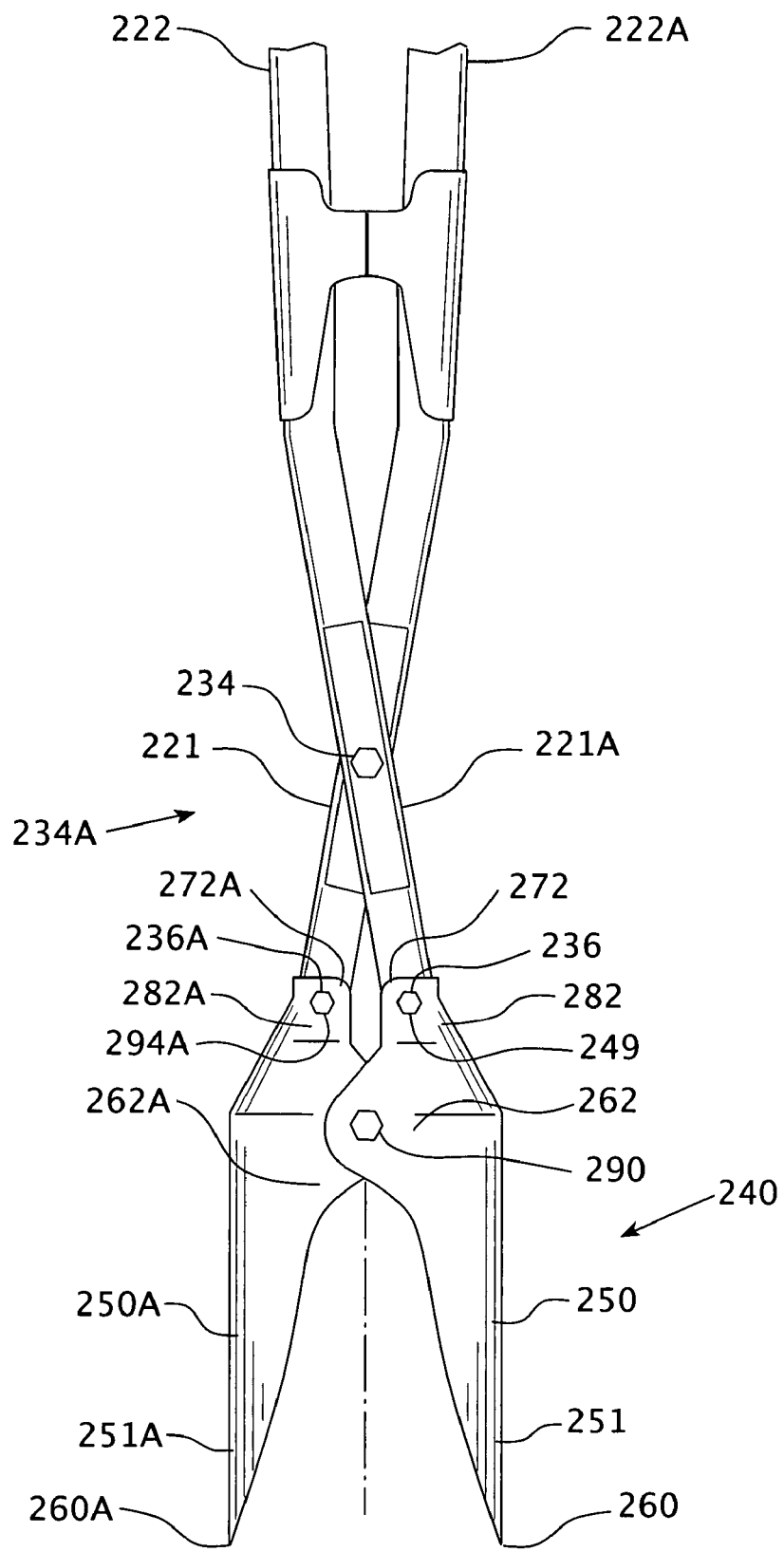
FIG. 8 is a detailed view of an alternate embodiment post hole digger.

A second embodiment of a post hole digger 210 is shown in FIGS. 6-8. In this embodiment the post hole digger 210 is similar to the embodiment described above and similar reference numbers increased by "200" shall be used. For example, the embodiment described above includes a blade assembly 40, accordingly, in this embodiment, the similar blade assembly shall be identified by the reference number 240. Further the convention of identifying opposing but similar components with the letter "A" shall also be maintained. While this embodiment is similar to the embodiment described above, a reduced length of the handle assemblies 220, 220A eliminates the need for a handle assembly lower portion 28 that is angled relative to the handle assembly medial portion 26. Thus, rather than a handle assembly lower portion 28 and a handle assembly medial portion 26, this embodiment has generally straight lower sections 221, 221A. Unless otherwise set forth below in relation to the lower sections 221, 221A, the other components, e.g., blade assembly clevis 282, shall not be specifically identified below and it is understood that such components are similar, if not identical, to the components in the embodiment described above. However, it is further noted that, due to the smaller size of this embodiment, various dimensions are different and some dimensions are set forth below explicitly.

In this embodiment, the first handle assembly 220 includes an elongated handle member 222 has an elongated, upper portion 224, and a generally straight lower section 221. Between each handle assembly upper portions 224, 224A and the handle assembly lower section 221, 221A is a longitudinal bend 219, 219A. The longitudinal bends 219, 219A are not the same as the lateral transition sections 294, 294A, described below. That is, the longitudinal bends 219, 219A define the angle "Z" described below. The first handle assembly handle member upper portion 224 has an upper end 230. The first handle assembly lower section 221 has a lower end 232. The first handle assembly upper portion 224 has a longitudinal axis 225. The first handle assembly lower section 221 has a longitudinal axis 223. The first handle assembly lower section 221 has a pivot opening 234 extending generally perpendicular to the first handle assembly lower section longitudinal axis 223. The first handle assembly lower end 232 has a first blade sub-assembly pivot opening 236 which also extends generally perpendicular to the first handle assembly lower section longitudinal axis 223. Thus, in this embodiment the first pivot point 214 is disposed on the handle assembly lower sections 221, 221A.

As shown in FIG. 8, the angle, identified as angle "Z," between the first handle assembly handle member upper portion longitudinal axis 225 and the first handle assembly lower section longitudinal axis 223 is between about 5 to 14 degrees, and more preferably about 9.29 degrees. The first handle assembly upper portion 224 has a length between about 26.0 and 40 inches, and more preferably about 32.5 inches. The first handle assembly lower section 221 has a length between about 12 and 20 inches, and more preferably about 16.0 inches.

It is further noted that the handle assembly upper portions 224, 224A include lateral transition sections 294, 294A that are structured to offset the handle assembly upper portions 224, 224A relative to the handle assembly lower sections 221, 221A. The lateral transition sections 294, 294A are disposed on the handle assembly upper portions 224, 224A just above the longitudinal bends 219, 219A. Thus, when the first and second handle assemblies 220, 220A are coupled at the first pivot point 214, the handle assembly lower sections 221, 221A each travel in separate first and second planes, respectively, and a substantial length of the handle assembly upper portions 224, 224A, that is, the length disposed above the lateral transition sections 294, 294A, travel in the same general plane. The blade assembly 240 of this embodiment is substantially similar to the blade assembly 40 described above and it is understood that the blade assembly of this embodiment operates in a substantially similar manner as the blade assembly 40 described above. However, it is noted that, due to the variation in size, the blade sub-assembly offset tabs 262, 262A, which in this embodiment resemble "ears" on the blades, each have a length of between about 1.5 and 5.0 inches and more preferably about 2.5 inches. The length of the offset tabs 262, 262A are measured from the blade surface along the longitudinal center of the blade sub-assembly blade portion 251, 251A adjacent to the blade sub-assembly offset tabs 262, 262A to the pivot point of the blade sub-assembly offset tabs 262, 262A. Further each blade sub-assembly 250, 250A has a length between about 8.0 and 16.0 inches, and more preferably about 14.0 inches.

The blade assembly 240 is pivotally coupled to the first and second handle assemblies 220, 220A. More specifically, the first blade sub-assembly 250 is pivotally coupled to the first handle assembly handle member lower end 232 by a first blade sub-assembly pivot pin 249. The first blade sub-assembly pivot pin 249 extends through the first blade sub-assembly clevis 282 as well as the first handle member first blade sub-assembly pivot opening 236. Similarly, the second blade sub-assembly 250A is pivotally coupled to the second handle assembly handle member lower end 232A by a second blade sub-assembly pivot pin 249A. The second blade sub-assembly pivot pin 249A extends through the second blade sub-assembly clevis 282A as well as the second handle member second blade sub-assembly pivot opening 236A. The first handle assembly lower end 232 is between about 2.5 and 6.0 inches, and preferably 4.52 inches, from the traverse, first pivot point 214. In this configuration, the tool assembly has a central longitudinal axis 300 extending through the traverse, first pivot point 214 and the blade assembly pivot point 290. It is further noted that, because each blade sub-assembly 250, 250A remains substantially to one side of the blade assembly pivot point 290, the blade assembly pivot point 290 is an offset pivot point.

In this configuration the first handle assembly 220 and the second handle assembly 220A are structured to pivot relative to each other between a first position, wherein the first handle assembly upper end 230 and the second handle assembly upper end 230A are generally adjacent to each other (FIG. 6) and a second position wherein the first handle assembly upper end 230 and the second handle assembly upper end 230A are generally spaced from each other (FIG. 7). As the first handle assembly 220 and the second handle assembly 220A move between the first and second positions, the first blade sub-assembly 250 and the second blade sub-assembly 250A move between a corresponding first, open position and a second, closed position. That is, the first blade sub-assembly 250 and the second blade sub-assembly 250A are structured to pivot relative to each other between a first, open position and a second, closed position wherein when the first handle assembly 220 and the second handle assembly 220A are in the first position, the first blade sub-assembly 250 and the second blade sub-assembly 250A are in the first, open position, and, when the first handle assembly 220 and the second handle assembly 220A are in the second position, the first blade sub-assembly 250 and the second blade sub-assembly 250A are in the second, closed position.

Because the first pivot point 214 is a traverse pivot point, as the first handle assembly upper end 230 and the second handle assembly upper end 230A move apart, the first handle assembly lower end 232 and the second handle assembly lower end 232A also move apart. As the first handle assembly lower end 232 and the second handle assembly lower end 232A move apart, the first blade sub-assembly clevis 282, which is coupled to the first handle assembly lower end 232, and the second blade sub-assembly clevis 282A, which is coupled to the second handle assembly lower end 232A, also move apart. Because the blade assembly pivot point 290 is an offset pivot point, as the first and second blade sub-assembly blade base body upper, first ends 272, 272A move apart, the first and second blade sub-assembly blade body lower ends 260, 260A move toward each other.

Preferably, the traverse, first pivot point 214 and the blade assembly pivot point 290 are disposed between 5.25 and 8.25 inches apart, and more preferably about 6.27 inches apart. Thus, as shown on FIG. 7 by angle "Y," the range of motion for the first and second handle assemblies 220, 220A moving between the first and second positions is between about 4.0 degrees and 9.0 degrees relative to the central longitudinal axis 300, and more preferably about 7.42 degrees. Additionally, as represented by the angle "X," the first and second blade sub-assembly blade portions 251, 251A travels between about 12.0 and 18.0 degrees, and more preferably about 15.32 degrees relative to the central longitudinal axis 300 as the first blade sub-assembly 250 moves between the first, open position and the second, closed position.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A post hole digger comprising:
    a first handle assembly having an elongated handle member, said first handle assembly handle member having an upper portion with a longitudinal axis and a lower section with a longitudinal axis;
    a second handle assembly having an elongated handle member, said second handle assembly handle member having an upper portion with a longitudinal axis and a lower section with a longitudinal axis;
    said first handle assembly pivotally coupled to said second handle assembly at a first, traverse pivot point, said first, traverse pivot point disposed on said first handle assembly handle member lower section and said second handle assembly handle member lower section;
    a blade assembly having a first blade sub-assembly and a second blade sub-assembly;
    said first blade sub-assembly pivotally coupled to said first handle assembly, said first blade sub-assembly having an elongated blade portion having an upper end and a lower end;
    said second blade sub-assembly pivotally coupled to said second handle assembly, said second blade sub-assembly having an elongated blade portion having an upper end and a lower end;
    said first blade sub-assembly and said second blade sub-assembly coupled together at a blade assembly pivot point, said blade assembly pivot point disposed on said first blade sub-assembly blade portion upper end and said second blade sub-assembly blade portion upper end; and
    a central longitudinal axis extending through said traverse, first pivot point and said blade assembly pivot point;
    said first handle assembly and said second handle assembly are structured to pivot relative to each other between a first position, wherein said first handle assembly upper end and said second handle assembly upper end adjacent to each other and a second position wherein said first handle assembly upper end and said second handle assembly upper end are generally spaced from each other;
    said first blade sub-assembly and said second blade sub-assembly being structured to pivot relative to each other between a first, open position and a second, closed position, and wherein when said first handle assembly and said second handle assembly are in said first position, said first blade sub-assembly and said second blade sub-assembly are in said first, open position, and, when said first handle assembly and said second handle assembly are in said second position, said first blade sub-assembly and said second blade sub-assembly are in said second, closed position;
    wherein said first handle assembly and said second handle assembly travel between about 4.0 degrees and 9.0 degrees relative to said central longitudinal axis when moved between said first position and said second position;
    said first blade sub-assembly blade portion is elongated and has a longitudinal axis;
    said second blade sub-assembly blade portion is elongated and has a longitudinal axis;
    said first blade sub-assembly includes an elongated blade base having a longitudinal axis, said first blade sub-assembly blade base longitudinal axis being angled relative to said first blade sub-assembly blade portion longitudinal axis;
    said second blade sub-assembly includes an elongated blade base having a longitudinal axis, said second blade sub-assembly blade base longitudinal axis being angled relative to said second blade sub-assembly blade portion longitudinal axis;
    said first handle assembly handle member upper portion longitudinal axis being angled between about 5 degrees to 14 degrees relative to said first handle assembly handle member lower section longitudinal axis; and
    said second handle assembly handle member upper portion longitudinal axis being angled between about 5 degrees to 14 degrees relative to said second handle assembly handle member lower section longitudinal axis.

2. The post hole digger of claim 1 wherein:
    said first handle assembly handle member lower section is generally disposed in a first lower plane;
    said first handle assembly handle member upper portion has a lateral transition section, said first handle assembly lateral transition section being offset from said first lower plane;
    said first handle assembly handle member upper portion lateral transition section disposed above said first handle assembly handle member lower section, whereby a substantial length of said first handle assembly handle member upper portion is disposed in an upper plane;
    said second handle assembly handle member lower section is generally disposed in a second lower plane;
    said second handle assembly handle member upper portion has a lateral transition section, said second handle assembly lateral transition section being offset from said second lower plane;
    said second handle assembly handle member upper portion lateral transition section disposed above said second handle assembly handle member lower section, whereby a substantial length of said second handle assembly handle member upper portion is disposed in an upper plane; and
    wherein said a substantial length of first handle assembly handle member upper portion and a substantial length of said second handle assembly handle member upper portion are disposed in, generally, the same plane.

3. A post hole digger comprising:

a first handle assembly having an elongated handle member, said first handle assembly handle member having an upper portion with a longitudinal axis and a lower section with a longitudinal axis and a lower end;

a second handle assembly having an elongated handle member, said second handle assembly handle member having an upper portion with a longitudinal axis and a lower section with a longitudinal axis and a lower end;

said first handle assembly pivotally coupled to said second handle assembly at a first, traverse pivot point, said first, traverse pivot point disposed on said first handle assembly handle member lower section and said second handle assembly handle member lower section;

a blade assembly having a first blade sub-assembly and a second blade sub-assembly;

said first blade sub-assembly pivotally coupled to said first handle assembly, said first blade sub-assembly having an elongated blade portion having an upper end and a lower end;

said second blade sub-assembly pivotally coupled to said second handle assembly, said second blade sub-assembly having an elongated blade portion having an upper end and a lower end;

said first blade sub-assembly and said second blade sub-assembly coupled together at a blade assembly pivot point, said blade assembly pivot point disposed on said first blade sub-assembly blade portion upper end and said second blade sub-assembly blade portion upper end;

a central longitudinal axis extending through said traverse, first pivot point and said blade assembly pivot point;

said first handle assembly and said second handle assembly are structured to pivot relative to each other between a first position wherein said first handle assembly upper end and said second handle assembly upper end adjacent to each other and a second position wherein said first handle assembly upper end and said second handle assembly upper end are generally spaced from each other;

said first blade sub-assembly and said second blade sub-assembly being structured to pivot relative to each other between a first, open position and a second, closed position, and wherein when said first handle assembly and said second handle assembly are in said first position, said first blade sub-assembly and said second blade sub-assembly are in said first, open position, and, when said first handle assembly and said second handle assembly are in said second position, said first blade sub-assembly and said second blade sub-assembly are in said second, closed position;

wherein said first handle assembly and said second handle assembly travel between about 4.0 degrees and 9.0 degrees relative to said central longitudinal axis when moved between said first position and said second position;

said first blade sub-assembly blade portion is elongated and has a longitudinal axis;

said second blade sub-assembly blade portion is elongated and has a longitudinal axis;

said first blade sub-assembly includes an elongated blade base having a longitudinal axis, said first blade sub-assembly blade base longitudinal axis being angled relative to said first blade sub-assembly blade portion longitudinal axis;

said second blade sub-assembly includes an elongated blade base having a longitudinal axis, said second blade sub-assembly blade base longitudinal axis being angled relative to said second blade sub-assembly blade portion longitudinal axis;

said first handle assembly lower end is between about 2.5 inches and 6.0 inches from said traverse, first pivot point;

said second handle assembly lower end is between about 2.5 inches and 6.0 inches from said traverse, first pivot point;

said blade assembly pivot point is disposed between about 5.25 inches and 8.25 inches from said traverse, first pivot point;

said first blade sub-assembly includes an offset tab extending from said first blade sub-assembly blade portion upper end;

said second blade sub-assembly includes an offset tab extending from said second blade sub-assembly blade portion upper end;

said first blade sub-assembly offset tab has a length of between about 1.5 inches and 5.0 inches;

said second blade sub-assembly offset tab has a length of between about 1.5 inches and 5.0 inches;

said first blade sub-assembly having a length of between about 8.0 inches and 16.0 inches; and said second blade sub-assembly having a length of between about 8.0 inches and 16.0 inches.

4. A post hole digger comprising:

a first handle assembly having an elongated handle member, said first handle assembly handle member having an upper portion with a longitudinal axis and a lower section with a longitudinal axis;

a second handle assembly having an elongated handle member, said second handle assembly handle member having an upper portion with a longitudinal axis and a lower section with a longitudinal axis;

said first handle assembly pivotally coupled to said second handle assembly at a first, traverse pivot point, said first, traverse pivot point disposed on said first handle assembly handle member lower section and said second handle assembly handle member lower section;

a blade assembly having a first blade sub-assembly and a second blade sub-assembly;

said first blade sub-assembly pivotally coupled to said first handle assembly, said first blade sub-assembly having an elongated blade portion having an upper end and a lower end;

said second blade sub-assembly pivotally coupled to said second handle assembly, said second blade sub-assembly having an elongated blade portion having an upper end and a lower end;

said first blade sub-assembly and said second blade sub-assembly coupled together at a blade assembly pivot point, said blade assembly pivot point disposed on said first blade sub-assembly blade portion upper end and said second blade sub-assembly blade portion upper end;

a central longitudinal axis extending through said traverse, first pivot point and said blade assembly pivot point;

said first handle assembly and said second handle assembly are structured to pivot relative to each other between a first position, wherein said first handle assembly upper end and said second handle assembly upper end adjacent to each other and a second position wherein said first handle assembly upper end and said second handle assembly upper end are generally spaced from each other;

said first blade sub-assembly and said second blade sub-assembly being structured to pivot relative to each other between a first, open position and a second, closed position, and wherein when said first handle assembly and said second handle assembly are in said first position, said first blade sub-assembly and said second blade sub-assembly are in said first, open position, and, when said first handle assembly and said second handle assembly are in said second position, said first blade sub-assembly and said second blade sub-assembly are in said second, closed position;

wherein said first handle assembly and said second handle assembly travel between about 4.0 degrees and 9.0 degrees relative to said central longitudinal axis when moved between said first position and said second position;

said first blade sub-assembly blade portion is elongated and has a longitudinal axis;

said second blade sub-assembly blade portion is elongated and has a longitudinal axis;

said first blade sub-assembly includes an elongated blade base having a longitudinal axis, said first blade sub-assembly blade base longitudinal axis being angled relative to said first blade sub-assembly blade portion longitudinal axis;

said second blade sub-assembly includes an elongated blade base having a longitudinal axis, said second blade sub-assembly blade base longitudinal axis being angled relative to said second blade sub-assembly blade portion longitudinal axis;

said first blade sub-assembly blade portion travels between about 12.0 degrees and 18.0 degrees relative to said central longitudinal axis as said first blade sub-assembly moves between said first, open position and said second, closed position; and said second blade sub-assembly blade portion travels between about 12.0 degrees and 18.0 degrees relative to said central longitudinal axis as said second blade sub-assembly moves between said first, open position and said second, closed position.

5. A post hole digger comprising:

a first handle assembly having an elongated handle member, said first handle assembly handle member having an upper portion with a longitudinal axis and a lower section with a longitudinal axis and a lower end;

a second handle assembly having an elongated handle member, said second handle assembly handle member having an upper portion with a longitudinal axis and a lower section with a longitudinal axis and a lower end;

said first handle assembly pivotally coupled to said second handle assembly at a first, traverse pivot point, said first, traverse pivot point disposed on said first handle assembly handle member lower section and said second handle assembly handle member lower section;

a blade assembly having a first blade sub-assembly and a second blade sub-assembly;

said first blade sub-assembly pivotally coupled to said first handle assembly, said first blade sub-assembly having an elongated blade portion having an upper end and a lower end;

said second blade sub-assembly pivotally coupled to said second handle assembly, said second blade sub-assembly having an elongated blade portion having an upper end and a lower end;

said first blade sub-assembly and said second blade sub-assembly coupled together at a blade assembly pivot point, said blade assembly pivot point disposed on said first blade sub-assembly blade portion upper end and said second blade sub-assembly blade portion upper end;

a central longitudinal axis extending through said traverse, first pivot point and said blade assembly pivot point;

said first handle assembly and said second handle assembly are structured to pivot relative to each other between a first position, wherein said first handle assembly upper end and said second handle assembly upper end adjacent to each other and a second position wherein said first handle assembly upper end and said second handle assembly upper end are generally spaced from each other;

said first blade sub-assembly and said second blade sub-assembly being structured to pivot relative to each other between a first, open position and a second, closed position, and wherein when said first handle assembly and said second handle assembly are in said first position, said first blade sub-assembly and said second blade sub-assembly are in said first, open position, and, when said first handle assembly and said second handle assembly are in said second position, said first blade sub-assembly and said second blade sub-assembly are in said second, closed position;

wherein said first handle assembly and said second handle assembly travel between about 4.0 degrees and 9.0 degrees relative to said central longitudinal axis when moved between said first position and said second position;

said first blade sub-assembly blade portion is elongated and has a longitudinal axis;

said second blade sub-assembly blade portion is elongated and has a longitudinal axis;

said first blade sub-assembly includes an elongated blade base having a longitudinal axis, said first blade sub-assembly blade base longitudinal axis being angled relative to said first blade sub-assembly blade portion longitudinal axis;

said second blade sub-assembly includes an elongated blade base having a longitudinal axis, said second blade sub-assembly blade base longitudinal axis being angled relative to said second blade sub-assembly blade portion longitudinal axis;

said first handle assembly handle member upper portion longitudinal axis being angled about 9.29 degrees relative to said first handle assembly handle member lower section longitudinal axis; and said second handle assembly handle member upper portion longitudinal axis being angled about 9.29 degrees relative to said second handle assembly handle member lower section longitudinal axis.

6. The post hole digger of claim 5 wherein:

said first blade sub-assembly includes an offset tab extending from said first blade sub-assembly blade portion upper end;

said second blade sub-assembly includes an offset tab extending from said second blade sub-assembly blade portion upper end;

said first handle assembly lower end is about 4.52 inches from said traverse, first pivot point;

said second handle assembly lower end is about 4.52 inches from said traverse, first pivot point;

said blade assembly pivot point is disposed about 6.27 inches from said traverse, first pivot point;

said first blade sub-assembly offset tab has a length of about 2.5 inches;

said second blade sub-assembly offset tab has a length of about 2.5 inches;
said first blade sub-assembly having a length of about 14.0 inches; and
said second blade sub-assembly having a length of about 14.0 inches.

7. The post hole digger of claim 5 wherein:
said first blade sub-assembly blade portion travels about 15.32 degrees relative to said central longitudinal axis as said first blade sub-assembly moves between said first, open position and said second, closed position; and
said second blade sub-assembly blade portion travels about 15.32 degrees relative to said central longitudinal axis as said second blade sub-assembly moves between said first, open position and said second, closed position.

8. The post hole digger of claim 5 wherein:
said first handle assembly handle member lower section is generally disposed in a first lower plane;
said first handle assembly handle member upper portion has a lateral transition section, said first handle assembly lateral transition section being offset from said first lower plane;
said first handle assembly handle member upper portion lateral transition section disposed above said first handle assembly handle member lower section, whereby a substantial length of said first handle assembly handle member upper portion is disposed in an upper plane;
said second handle assembly handle member lower section is generally disposed in a second lower plane;
said second handle assembly handle member upper portion has a lateral transition section, said second handle assembly lateral transition section being offset from said second lower plane;
said second handle assembly handle member upper portion lateral transition section disposed above said second handle assembly handle member lower section, whereby a substantial length of said second handle assembly handle member upper portion is disposed in an upper plane; and
wherein said a substantial length of first handle assembly handle member upper portion and a substantial length of said second handle assembly handle member upper portion are disposed in, generally, the same plane.

9. A post hole digger comprising:
a first handle assembly having an elongated handle member, said first handle assembly handle member having an upper portion with a longitudinal axis and a lower section with a longitudinal axis;
a second handle assembly having an elongated handle member, said second handle assembly handle member having an upper portion with a longitudinal axis and a lower section with a longitudinal axis;
said first handle assembly pivotally coupled to said second handle assembly at a first, traverse pivot point, said first, traverse pivot point disposed on said first handle assembly handle member lower section and said second handle assembly handle member lower section;
a blade assembly having a first blade sub-assembly and a second blade sub-assembly;
said first blade sub-assembly pivotally coupled to said first handle assembly, said first blade sub-assembly having an elongated blade portion having an upper end and a lower end;
said second blade sub-assembly pivotally coupled to said second handle assembly, said second blade sub-assembly having an elongated blade portion having an upper end and a lower end;
said first blade sub-assembly and said second blade sub-assembly coupled together at a blade assembly pivot point, said blade assembly pivot point disposed on said first blade sub-assembly blade portion upper end and said second blade sub-assembly blade portion upper end;
a central longitudinal axis extending through said traverse, first pivot point and said blade assembly pivot point;
said first handle assembly and said second handle assembly are structured to pivot relative to each other between a first position, wherein said first handle assembly upper end and said second handle assembly upper end adjacent to each other and a second position wherein said first handle assembly upper end and said second handle assembly upper end are generally spaced from each other;
said first blade sub-assembly and said second blade sub-assembly being structured to pivot relative to each other between a first, open position and a second, closed position, and wherein when said first handle assembly and said second handle assembly are in said first position, said first blade sub-assembly and said second blade sub-assembly are in said first, open position, and, when said first handle assembly and said second handle assembly are in said second position, said first blade sub-assembly and said second blade sub-assembly are in said second, closed position;
wherein said first handle assembly and said second handle assembly travel between about 4.0degrees and 9.0 degrees relative to said central longitudinal axis when moved between said first position and said second position;
said first blade sub-assembly blade portion travels between about 12 degrees and 18 degrees relative to said central longitudinal axis as said first blade sub-assembly moves between said first, open position and said second, closed position; and
said second blade sub-assembly blade portion travels between about 12 degrees and 18 degrees relative to said central longitudinal axis as said second blade sub-assembly moves between said first, open position and said second, closed position.

10. The post hole digger of claim 9 wherein:
said first blade sub-assembly blade portion travels about 15.32 degrees relative to said central longitudinal axis as said first blade sub-assembly moves between said first, open position and said second, closed position; and
said second blade sub-assembly blade portion travels about 15.32 degrees relative to said central longitudinal axis as said second blade sub-assembly moves between said first, open position and said second, closed position.

* * * * *